(12) United States Patent
Mietke

(10) Patent No.: US 11,726,779 B2
(45) Date of Patent: Aug. 15, 2023

(54) CODE SIMPLIFICATION SYSTEM

(71) Applicant: SAP SE, Walldorf (DE)

(72) Inventor: Sebastian Mietke, Reilingen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/518,113

(22) Filed: Nov. 3, 2021

(65) Prior Publication Data

US 2023/0139119 A1     May 4, 2023

(51) Int. Cl.
*G06F 8/72* (2018.01)
*G06F 8/20* (2018.01)
*G06F 8/75* (2018.01)

(52) U.S. Cl.
CPC .......... *G06F 8/72* (2013.01); *G06F 8/24* (2013.01); *G06F 8/751* (2013.01)

(58) Field of Classification Search
CPC .............. G06F 8/751; G06F 8/24; G06F 8/72
See application file for complete search history.

(56) References Cited

U.S. PATENT DOCUMENTS

| | | | |
|---|---|---|---|
| 6,519,767 B1 * | 2/2003 | Carter ................ | G06F 8/71 717/122 |
| 9,594,544 B2 * | 3/2017 | Wang .................. | G06F 8/38 |
| 9,720,690 B2 | 8/2017 | Abadi et al. | |
| 10,146,531 B2 | 12/2018 | Ghouti et al. | |
| 10,353,701 B2 | 7/2019 | Atanasiu et al. | |
| 11,042,369 B1 | 6/2021 | Kimball et al. | |
| 2006/0282458 A1 * | 12/2006 | Tsyganskiy ........ | G06F 8/72 707/999.102 |
| 2008/0044016 A1 * | 2/2008 | Henzinger .......... | G06F 16/958 707/E17.116 |

(Continued)

FOREIGN PATENT DOCUMENTS

GB     2537880 A     11/2016

OTHER PUBLICATIONS

Alizadeh, V. et al., "An InteractiveAn Interactive and Dynamic Search-Based Approach to Software Refactoring Recommendations and Dynamic Search-Based Approach to Software Refactoring Recommendations," IEEE Transactions on Software Engineering, pp. 932-961 (Oct. 1, 2018).

(Continued)

*Primary Examiner* — Phillip H Nguyen
(74) *Attorney, Agent, or Firm* — Sterne, Kessler, Goldstein & Fox P.L.L.C.

(57) ABSTRACT

Disclosed herein are various embodiments a code simplification system. An embodiment operates by receiving an identification of both a first code object and a second code object directed to producing a similar result. It is determined that the first code object and the second code object each include code subsets that correspond to each other. Differences between the code subsets of the first code object and the second code object are identified. The differences may include at least one of: a different ordering of the plurality of code subsets between the first code object and the second code object, or an additional code subset in the first code object that is not included in the second code object. A notification is provided with the differences, and input is received indicating an action to take by which either the first code object or the second code object are updated.

20 Claims, 6 Drawing Sheets

(56) References Cited

U.S. PATENT DOCUMENTS

| | | | |
|---|---|---|---|
| 2010/0241904 A1* | 9/2010 | Bailey | G06F 11/3692 |
| | | | 714/E11.208 |
| 2011/0010696 A1* | 1/2011 | Lobo | G06F 8/4435 |
| | | | 717/165 |
| 2015/0363269 A1* | 12/2015 | Baker | G06F 3/065 |
| | | | 714/766 |
| 2019/0317760 A1 | 10/2019 | Kessentini et al. | |

OTHER PUBLICATIONS

Lu, G. et al., "Automatic Simplification of Obfuscated JavaScript Code," Communications in Computer and Information Science, 17 pages (May 2012).

* cited by examiner

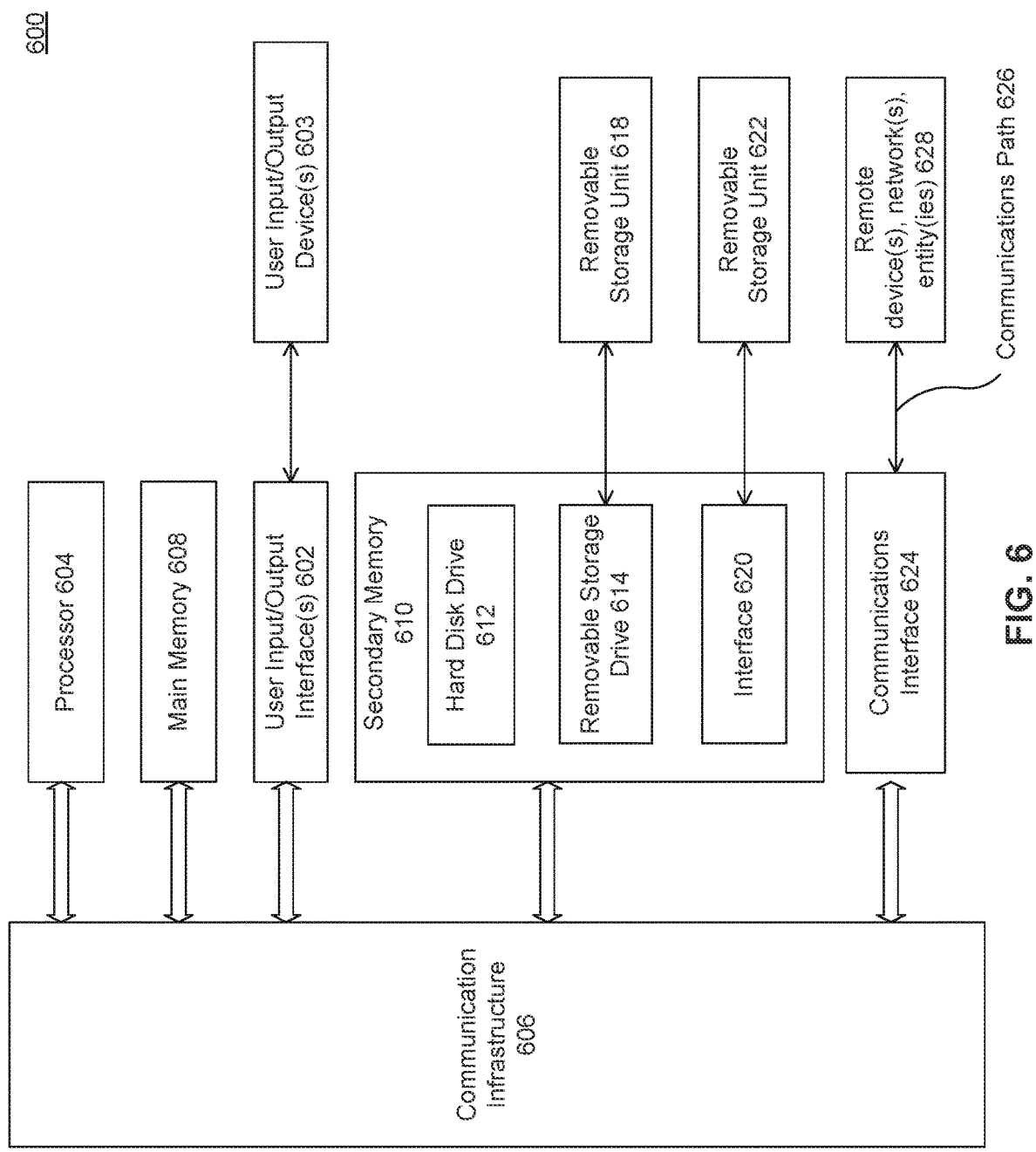

CODE SIMPLIFICATION SYSTEM

BACKGROUND

Software companies and other organizations usually spend a lot of time, money, and computing resources on maintaining their software products and source code. This maintenance may include debugging the code, fixing errors, and implementing other improvements that reduce memory consumption, increase speed of processing, and/or add new features.

One of the challenges in software development and maintenance is that different developers may be responsible for different parts of the software system or product, and these developers often have their own unique way of coding the same functions or functionality. These duplicate or redundant functions and code variations for similar functionality increase the complexity and cost (computationally and monetarily) for the organization and further prevent the organization from quickly or efficiently maintaining their code, especially as the software project grows and developers come and go.

BRIEF DESCRIPTION OF THE DRAWINGS

The accompanying drawings are incorporated herein and form a part of the specification.

FIG. 6 is an example computer system useful for implementing various embodiments.

In the drawings, like reference numbers generally indicate identical or similar elements. Additionally, generally, the left-most digit(s) of a reference number identifies the drawing in which the reference number first appears.

DETAILED DESCRIPTION

Software companies and other organizations usually spend a lot of time, money, and computing resources on maintaining their software products and source code. This maintenance may include debugging the code, fixing errors, and implementing other improvements that reduce memory consumption, increase speed of processing, and/or add new features.

One of the challenges in software development and maintenance is that different developers may be responsible for different parts of the software system or product, and these developers often have their own unique way of coding the same functions or functionality. These duplicate or redundant functions and code variations for similar functionality increase the complexity and cost (computationally and monetarily) for the organization and further prevent the organization from quickly or efficiently maintaining their code, especially as the software project grows and developers come and go.

Figure 1:
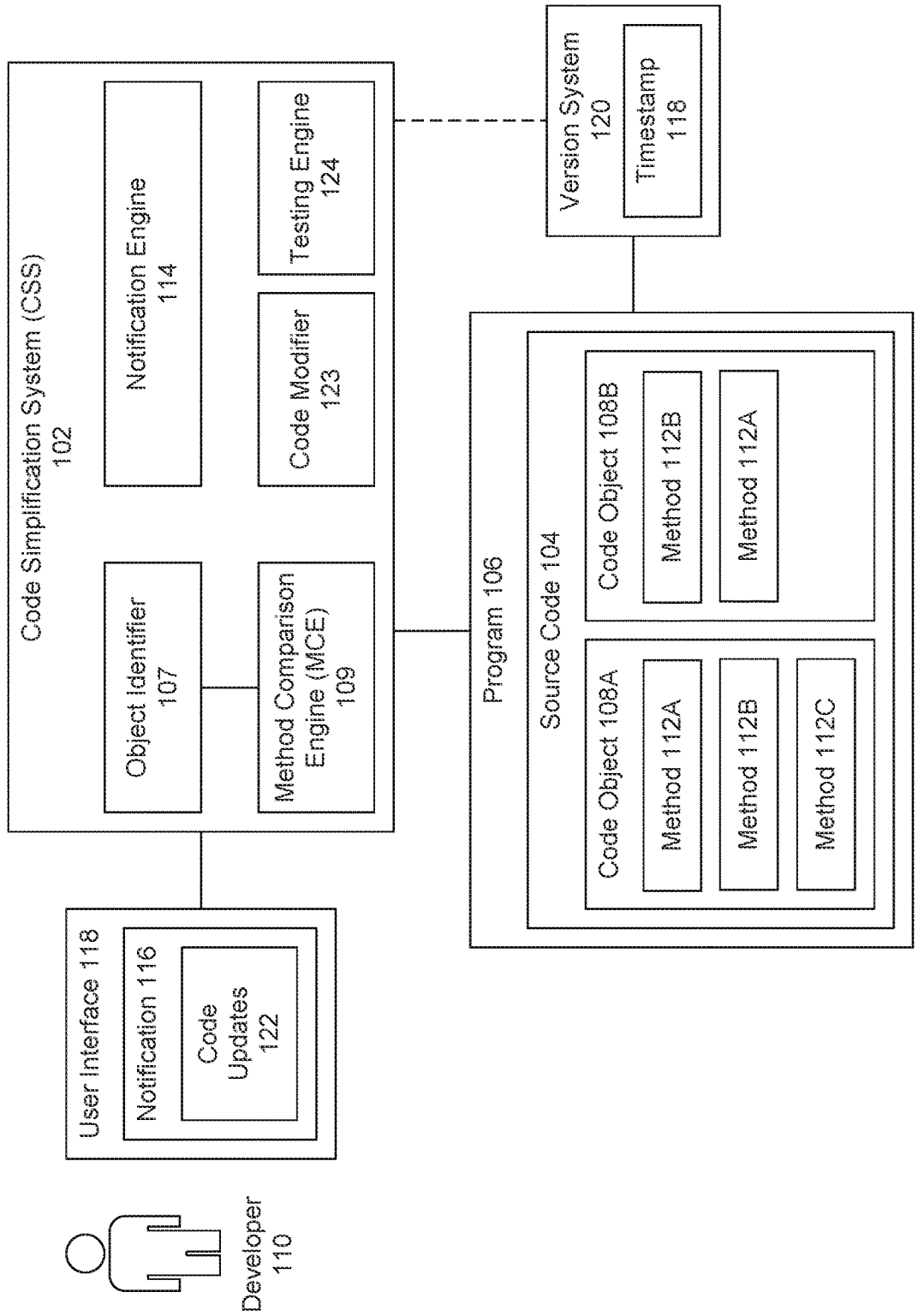
FIG. 1 is a block diagram illustrating functionality for a code simplification system (CSS), according to some example embodiments.

FIG. 1 is a block diagram 100 illustrating functionality for a code simplification system (CSS) 102, according to some example embodiments. CSS 102 may identify and correct or proposing corrections for code redundancies, missing functionality, and/or other variances in how various software objects, methods, classes, and other code objects or routines may have been coded, written, developed, organized, or implemented across one or more software projects.

In some embodiments, CSS 102 may analyze the source code 104 of a program 106 to identify variances and/or redundancies in how similar functionality may have been coded or written in the source code 104. This comparison may be performed amongst different portions of the same version of the source code 104, or across different versions of the source code 104.

Program 106 may be a system or application that is used by an end user (which may include a computing system) to perform various functionality, and source code 104 may be the actual software or computing code that is compiled and executed to perform at least a portion of the functionality of program 106. In some embodiments, program 106 may include a suite of related programs of software components that are either communicatively coupled or compatible with each other.

Source code 104 may be written in any computing language and with any coding style, including but not limited to object-oriented programming. In some embodiments, source code 104 may include a variety of different computing languages that are operating together across one or more files, and may include for example: extensible markup language (XML), hyper-text markup language (HMTL), structured query language (SQL), JAVA, PYTHON, etc.

In some embodiments, source code 104 may include various code objects 108A, 108B (referred to generally as code objects 108). Code objects 108 may include portions or sections of the source code 104 that have been identified as performing identical or similar functionality. Code objects 108 may include classes, objects, methods, identified lines or sections of code, code files, routines, etc. In some embodiments, CSS 102 may compare code object 108A to code object 108B to identify the variances and/or redundancies amongst the code objects 108A, 108B.

In some embodiments, object identifier 107 of CSS 102 may automatically (without user or developer 110 intervention) identify the code objects 108A, 108B to compare from within the source code 104. For example, source code 104 may have been developed using a particular naming convention which makes similar or redundant code objects 108A, 108B easy to identify because they include similar or pre-formatted names. For example, object identifier 107 may identify different objects with "customer" or "client" in the name to identify similar code objects 108.

In some embodiments, object identifier 107 may perform a line-by-line or segment-by-segment code analysis to identify different code objects 108A, 108B, that may be functionally similar. For example, if the code objects 108A, 108B include the same or similar number of if-then statements, then the code objects 108A, 108B may be identified as similar, or potentially similar. In some embodiments, code objects 108A, 108B may receive similar inputs and/or produce similar outputs. In some embodiments, CSS 102 may have access to a runtime recording of an execution the source code 104, and may use the recording to determine which code objects 108 perform similar functionality.

In some embodiments, if object identifier 107 performs automated analysis to identify code objects 108A, 108B, then the identified code objects 108A, 108B may be provided to developer 110 for confirmation via a user interface 118. Developer 110 may then confirm which of the identified code objects 108A, 108B are functionally similar or different, and whether the identified code objects 108A, 108B or other code objects 108 (as may be identified by developer 110) should be evaluated or compared by CSS 102. Developer 110 may also identify any missing code objects 108 (not identified by CSS 102 as being functionally similar), or provide a new set of code objects 108 that may be identified as being functionally similar and may evaluated against each other by CSS 102.

As just noted, in some embodiments, a human user, such as a developer 110, may identify the various code objects 108A, 108B within the source code 104 that are intended or directed to performing the same, similar, or identical functionality. For example, developer 110 may provide the name and storage location of similar code objects 108A, 108B. In some embodiments, developer 110 may also provide version information for the code objects 108. This manual identification of code objects 108A, 108B may be performed in addition to or in lieu of the automated identification by object identifier 107.

In some embodiments, developer HO may provide or identify a first code object 108A, and request that object identifier 107 to identify any similar code objects 108. Once provided or identified, one or more functionally similar code objects 108B, may be presented via a user interface 118, and developer 110 may be requested or prompted to confirm that the code objects 108A, 108B are functionally similar and should be compared or evaluated.

Once two or more code objects 108A, 108B have been identified as performing or being directed to performing similar functionality, a method comparison engine (MCE) 109 of CSS 102 may compare the code objects 108A, 108B to identify differences, similarities, redundancies, and/or other variances in the code objects 108A, 108B.

For the sake of simplicity and ease of understanding, the code objects 108A, 108B of FIG. 1 are illustrated as including only encapsulated methods 112. However, one skilled in the art will understand that the code objects 108 may include any types of code or program statements that may be compared including, but not limited to, methods, variables, logic, functions, routines, calls to other classes, or other statements or commands that may or may not be encapsulated in a separately named routine.

In the example illustrated, MCE 109 may identify that the code objects 108A, 108B include two overlapping methods 112A, 112B but that they are arranged in a different order. MCE 109 may also identify that code object 108A includes a method 112C that is not included in code object 108B. In some embodiments, these identified similarities and differences may be provided to a developer 110 for review via user interface 118.

In some embodiments, MCE 109 may interact with a version system 120 that maintains timestamps 118 that track when different source code 104 was written or modified, and by which developer(s) the code was submitted or written. The version system 120 may be any multi-versioning system that may be used to track updates and version information for program 106, source code 104, and/or code objects 108. Timestamp 118 may indicate the date/time of any code additions, deletions, or other modifications/updates.

Having this version and timestamp 118 information may be beneficial for a developer 110 or other user who may be tasked with determining or confirming what changes, modifications, or code updates 122 should and should not be made to the source code 104, based on the results of MCE 109. Using this historic information from the version system 120, CSS 102 may identify for developer 110 when the difference(s) or similarities were introduced to source code 104.

In some embodiments, CSS 102 may use the gathered information and comparisons to generate an initial set of questions for developer 110. These questions may be derived from the differences between the source code 104 of different objects 108A, 108B and/or different object versions (as identified from version system 120). Based on the answers to these questions, CSS 102 may identify how to modify or refactor the code objects 108A, 108B.

Some example questions are: Is the correction in line XY of the object XYZ, reported in customer incident 123 also relevant for the object ABC used in process F? Can the order of calls to the methods A and B be switched, so the code snippet 987 is identical in object the objects ABC and XYZ? Can/should the call to method A be made also in object XYZ?

The goal of the questions may be for CSS 102 to obtain from developer 110 information to identify which operations or code updates 122 can be performed, so that the source code 104 of the different objects 108A, 108B becomes more similar or identical, making the source code 104 easier to understand, maintain, and update.

In some embodiments, a notification engine 114 may provide the variances in the code objects 108A, 108B, as identified by MCE 109, in a notification 116 that is provided to the developer 110 or other user as code updates 122 via the user interface 118. User interface 118 may include a user interface or screen displayed on any computing device, such as a mobile phone, tablet, laptop, or desktop computer.

Notification 116 may provide various details regarding which code objects 108A, 108B were compared and the results of the comparison(s). Example details in the notification 116 may include the name of the developers who coded the code objects 108A, 108B, their relative lengths, their locations, their names, and relative timestamp(s) 118 and version information. In some embodiments, notification 116 may include any questions that are to be answered by developer 110.

In some embodiments, notification 116 may also include one or more code updates 122 which may detail the similarities and/or differences between the compared code objects 108A, 108B and may include recommendations on how to reduce the differences between the compared code objects 108A, 108B. In some embodiments, the code updates 122 may include recommendations on how to modify, reorder, update, or otherwise refactor the source code 104 based on the results of MCE 109.

For example, CSS 102 may recommend that method 112A and method 112B be re-ordered in code object 108B to correspond to the ordering of methods 112A, 112B in code object 108A. This recommendation may be based on a determination that the developer associated with code object 108A is more senior than the developer of code object 108B (which may be received from version system 120 or another computing system), or that code object 108A was developed before code object 108B, or that based on a run-time analysis code object 108A executed faster than code object 108B. This basis of the recommendations may also be provided to developer 110 via notification 116.

Based on notification 116, developer 110 may accept/approve, reject/deny, or change/modify the code recommendations of code updates 122. For example, notification 116 may provide developer with a recommendation to reverse the order of methods 112B, 112A of code object 108B to match code object 108A. In some embodiments, CSS 102 may also provide the alternative approach to reverse the order of methods 112A, 112B of code object 108A to match code object 108B, and may allow developer to choose either the first or second option. In some embodiments, only after developer 110 rejects the first recommended change will the alternative change be provided as an option via user interface 118.

Notification 116 may also include a recommendation to add method 112C to code object 108B to increase the uniformity or similarities between the code objects 108A, 108B. Additionally or alternatively, CSS 102 may provide developer 110 with the option to delete the method 112C from code object 108A. In some embodiments, this code removal or deletion may only be provided as an automated option in code updates 122 if there are no dependencies on method 112C identified anywhere else in the code object 108A. In some embodiments, CSS 102 may notify developer 110 of any identified dependencies preventing removal of method 112C.

In some embodiments, code updates 122 may include recommended changes to the source code 104 that may need to be made by one or more human users or developers 110. For example, since method 112A and 112B are included in both code object 108A and 108B, to save space and ease code maintenance, CSS 102 may recommend that actual computing code be removed from code object 108B, and only be included in code object 108A. CSS 102 may recommend that rather than including duplicate computing code (which increases maintenance, memory, processing costs) code object 108B inherits the methods 112A, 112B of code object 108A. This would result in fewer lines of source code 104 and easier updates and maintenance of source code 104. For example, updates to method 112A would then only be made in one location (at code object 108A) rather than two different locations.

It is understood that inheritance is one example of how the source code 104 may be reduced. In other embodiments, other approaches may be used or recommended by CSS 102. For example, CSS 102 may propose a new interface, to use a composition approach. Or, for example, CSS 102 may propose both inheritance and/or a new interface.

The recommended code updates 122 may be intended or designed to increase the similarities between two or more code objects 108A, 108B that are designed to perform similar or identical functionality. This increased similarity may help make maintaining the source code 104 easier and faster.

Developer 110, via user interface 118, may then reject or accept the various code updates 112 or changes recommended via notification 116. In some embodiments, a code modifier 123 may modify or change the source code 104 based on any code updates 122 (that may have been approved or pre-approved by a developer 110). In some embodiments, a developer 110 may pre-approve certain changes to be made, such as moving or re-ordering source code 104, which may not need to be approved prior to being performed by code modifier 123. Code modifier 123 may add new code, delete code, or reorder/move code. In some embodiments, the updated source code 104 (after the modifications by code modifier 123) may be saved as a new version by version system 120. In some embodiments, code modifier 123 may also request or compile new and/or updated source code 104.

In some embodiments, CSS 102 may use a testing engine 124 to ensure that the recompiled code executes properly, or as it was executing prior to the code updates 122 by code modifier 123. Testing engine 124 may be used to ensure that any recommended code updates 122 would successfully produce the intended results prior to recommending the code updates 122 to a developer 110. In using testing engine 124, code modifier 123 may make a change to one or both of code objects 108A, 108B, save the changed objects as a new or temporary version 120, and testing engine 124 may test the updated code objects 108A, 108B to make sure they are compiling and executing without errors and as previously intended to execute.

In some embodiments, automated tests with runtime data may be performed, to check the influence of the possible changes to any code objects 108A, 108B or other sections or portions of source code 104. This may result in a dialogue between CSS 102 and the developer 110. In some embodiments, many operations or changes to source code 104 may be generated and/or implemented automatically (e.g., without developer 110 intervention). As described herein, in some embodiments, developer 110 may be asked for confirmation on which to accept or reject proposed changed. In other embodiments, the changes may be implemented without developer 110 explicit approval.

If any errors arise in the testing, CSS 102 may reject the tested update and it may not be provided to developer 110 via notification 116. In some embodiments, CSS 102 may indicate that a particular code update was tested and failed. If, the updated code executes as expected, this may be provided as a recommended code update 122. If the developer 110 rejects all of the code updates 122, code modifier 123 may delete the newly created version(s) that were tested with testing engine 124. If the developer 110 accepts the code updates 122, then CSS 102 may activate or use the previously tested version of code as a new version responsive to the developer approval.

In some embodiments, CSS 102 may use runtime data to probe different modifications. In case of a possible refactoring, CSS 102 may record the runtime data for the objects in scope. This data can then be used to modify the underlying code and to re-execute the process again, after refactoring or testing various proposals (before or after they are presented to a developer 110). The output of the object can be checked. If no differences occur (over a longer observation time), the order of the calls may be deemed unimportant and the order may be modified. Testing engine 124 enables CSS 102 to check the output before a certain correction was made and compare it to the output after the correction is applied.

Figure 2:
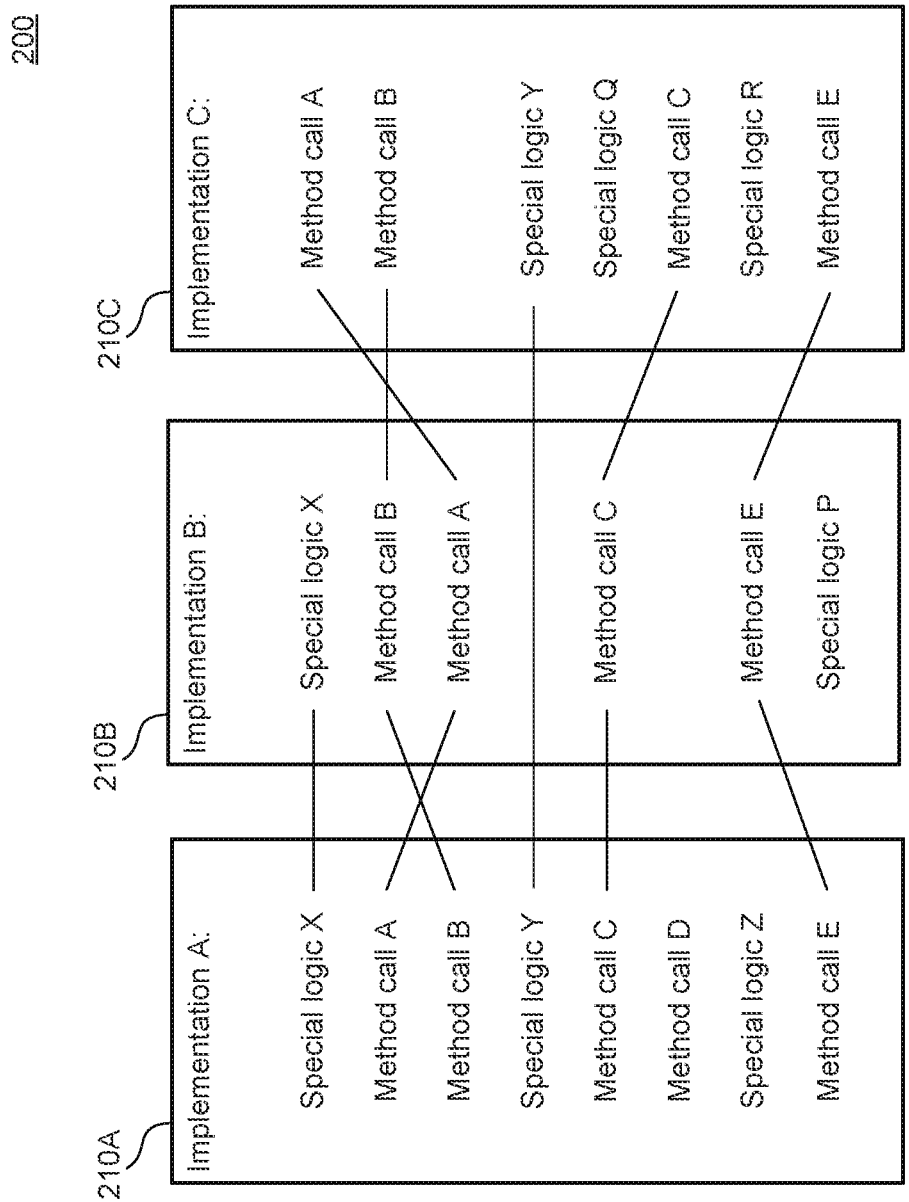
FIG. 2 is a block diagram illustrating functionality for a method comparison engine (MCE) of code simplification system (CSS), according to some example embodiments.

FIG. 2 is a block diagram 200 illustrating functionality for a method comparison engine (MCE) 109 of code simplification system (CSS) 102, according to some example embodiments.

Three example code objects 210A, 210B, and 210C may have been identified by a code identifier 107 and may be compared by MCE 109. The code objects 210A-C may be different encapsulations of code in a particular version of source code 104, or may be different versions of the same code object 108. MCE 109 may identify the various similarities and differences between the code objects 210A-C.

For example, MCE 109 may identify that all code objects 210A-C, include methods A and B, but that code object 210B includes them in a different order. In some embodiments, MCE 109 may recommend switching the order of method A and method B to match the other two code objects 210A and 210C.

MCE 109 may also flag to a developer that code objects 210A and 210B both include logic X, but code object 210C does not. MCE 109 may also flag that code objects 210A and 210C include logic Y, but that code logic 210B does not. The developer 110 may then have the option of adding or removing logic X and logic Y from any of the code objects 210A-C, or may decide to leave the code objects 210A-C as they are. Code modifier 123 may make any accepted recommendations or code updates 122.

As noted above, in some embodiments, CSS 102 may generate a set of questions for the developer to determine what refactoring can be performed by CSS 102. In the example illustrated, some questions that may be generated by CSS 102 include: Does the order of method A and B matter? Why is special logic Y missing in implementation B? Method call C is often performed directly after special logic Y. Can special logic Q be shifted after method call C? Why is special logic P (assigned to customer incident 123) not available in implementations A and C?

Depending on the feedback from the developer 110, refactoring proposals might be generated and/or performed by code modifier 123 of CSS 102.

Figure 3:
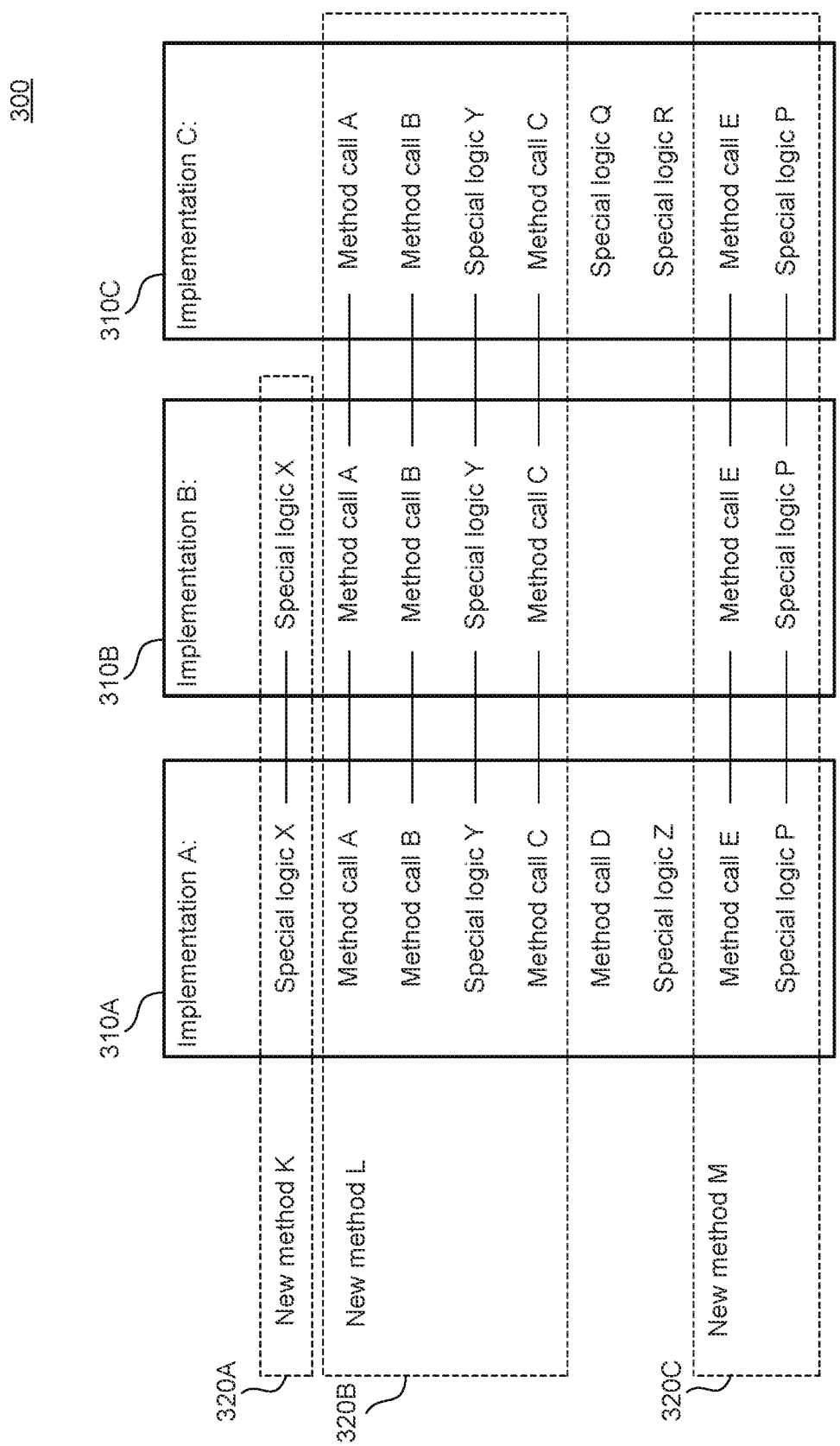
FIG. 3 is a block diagram illustrating functionality for a code modifier of code simplification system (CSS), according to some example embodiments.

FIG. 3 is a block diagram 300 illustrating functionality for a code modifier 123 of code simplification system (CSS) 102, according to some example embodiments. The code objects 310A-C may correspond to the code objects 210A-C of FIG. 2, after code modifier 123 has made the whatever code updates 122 that may have been accepted or approved by a developer 110 or that CSS 102 has otherwise determined to be acceptable based on the developer's answers to the questions presented.

For example, developer 110 may have rejected the recommendation to add logic X to code object 310C, but may have accepted recommendations to create uniformity amongst method A, method B, logic Y, and method C across the code objects 310A-C.

In some embodiments, CSS 102 may identify new methods 320A-C that exist amongst the various code objects. The new methods 320A-C may indicate sections of code that are identical or redundant amongst two or more of the code objects 310A-C. For example, the code of special logic X may be identical between 310A and 310B, and may be identified as a new method 320A.

In some embodiments, generic logic may be capsuled automatically in reusable routines. In some embodiments, CSS 102 may shift or recommend shifting this logic to one or more newly generated super-classes, whereas specific logic is transferred to newly generated sub-classes.

In some embodiments, the new methods may be provided to a developer 110 as a recommended manual or developer-initiated changes. For example, in some embodiments, after code modifier 123 performs the accepted automated code updates 122 (e.g., adding, removing, reordering sections of code in code objects 310A-C), MCE 109 may identify what code is identical amongst the code objects 310A-C, and identify new methods 320A-C. The new methods 320A-C may then be provided in a subsequent notification 116 to developer 110, who may choose to implement the recommendations or not. In some embodiments, CSS 120 may automatically generate and/or implement recommendations after receiving approval by developer 110.

Figure 4:
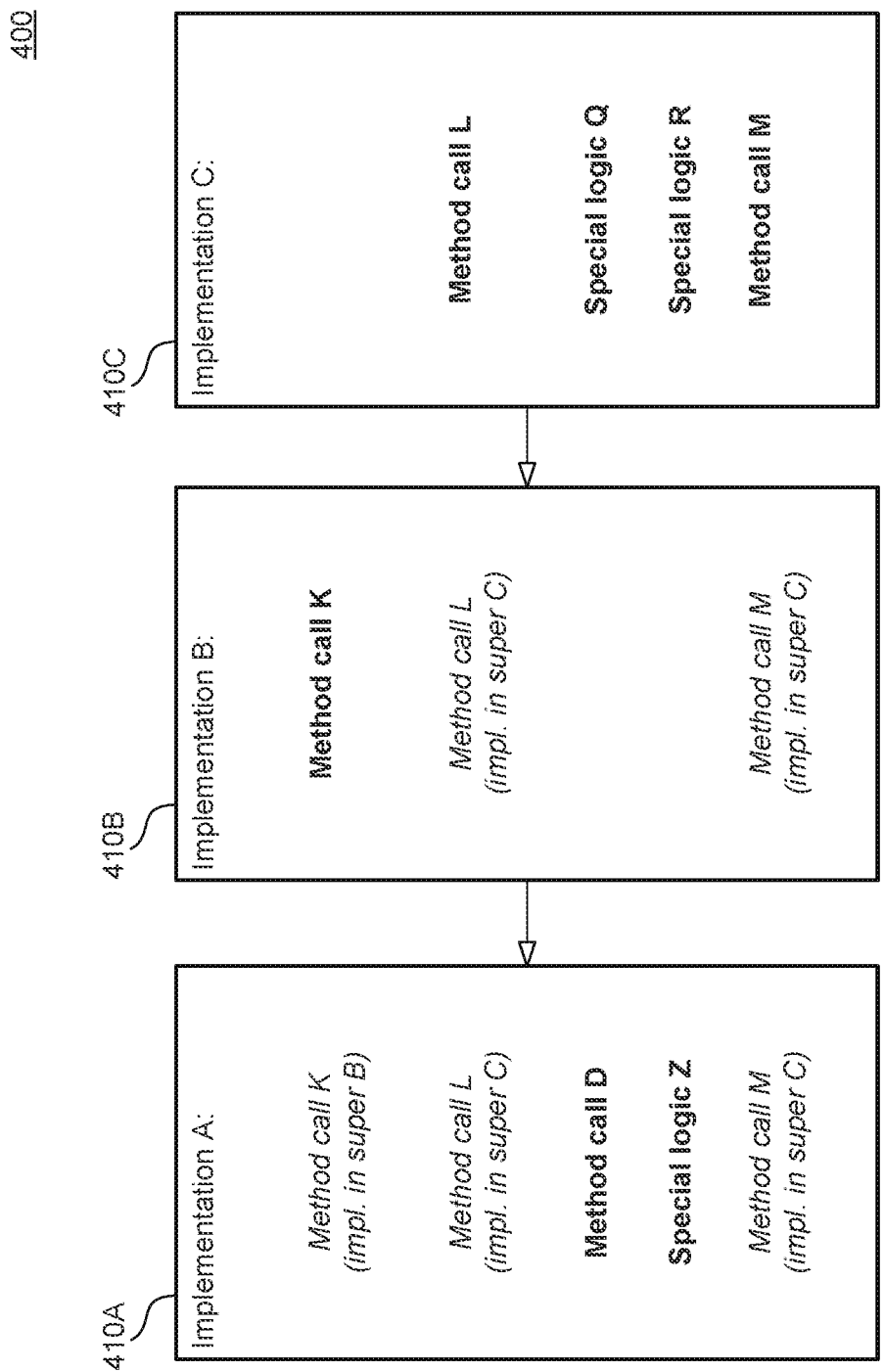
FIG. 4 is a block diagram illustrating an example modified source code after a developer update, according to some example embodiments.

FIG. 4 is a block diagram 400 illustrating an example modified source code 104 after a developer update, according to some example embodiments. Code objects 410A-C may correspond to code 310A-C, after a developer has implemented the new methods 320A-C and created super classes. FIG. 4 illustrates how much more streamlined the code can be by implementing the CSS 102 recommendations. For example, code objects 410A and 410B may include calls to method L in code object 410C. And object 410A may include a call to the method call K whose program code is only in code object 410B, thus eliminating multiple redundancies amongst the source code 104.

Figure 5:
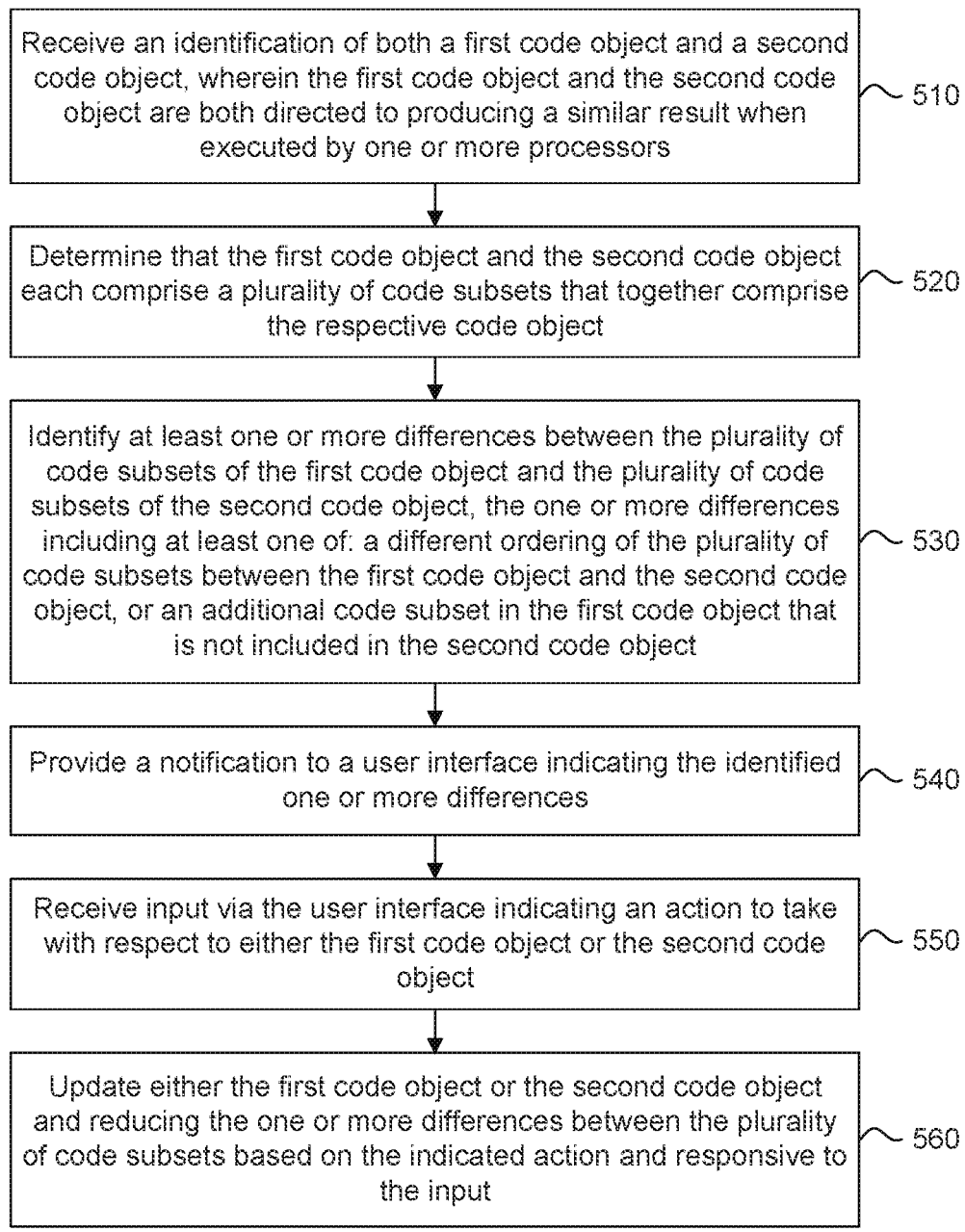
FIG. 5 is a flowchart illustrating example operations for functionality for a code simplification system (CSS), according to some embodiments.

FIG. 5 is a flowchart illustrating example operations for functionality for a code simplification system (CSS) 102, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Method 500 shall be described with reference to the figures.

At 510, an identification of both a first code object and a second code object is received, wherein the first code object and the second code object are both directed to producing a similar result when executed by one or more processors. For example, object identifier 107 may identify or receive from developer 110 an identification of code objects 108A and 108B, both of which may be directed to performing similar functionality when compiled and executed by a computing device, such as a server, tablet, desktop, or mobile phone.

At 520, it is determined that the first code object and the second code object each comprise a plurality of code subsets that together comprise the respective code object, wherein at least a first code subset of the first code object corresponds to a second code subset of the second code object. For example, CSS 102 may identify that code object 108A includes a set of method 112A-C, and code object 108B includes a set of methods 112B, 112A.

At 530, at least one or more differences between the plurality of code subsets of the first code object and the plurality of code subsets of the second code object are identified, the one or more differences including at least one of: a different ordering of the plurality of code subsets between the first code object and the second code object, or an additional code subset in the first code object that is not included in the second code object, or vice versa. For example, MCE 109 may determine that the ordering of the methods 112A, 112B varies between code object 108A and 108B.

At 540, a notification is provided to a user interface indicating the identified one or more differences. For example, notification engine 114 may generate a notification 116 with code updates 122 and questions for the developer 110 to determine how to change, update, or refactor the source code 104.

At 550, input is received via the user interface indicating an action to take with respect to either the first code object or the second code object. For example, CSS 102 may receive an indication to change the order of code object 108B, or that the order does not matter.

At 560, either the first code object or the second code object is updated to reduce the one or more differences between the plurality of code subsets based on the indicated action and responsive to the input. For example, code modifier 123 may reorder the method 112B and 112A to match code object 108A. In some embodiments, testing engine 124 may test the reordered code of the updated code object 108B to ensure that the results are similar to what was produced prior to the reordering.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include customer input/output device(s) 603, such as monitors, keyboards, pointing devices, etc., which may communicate with communication infrastructure 606 through customer input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random-access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" and/or cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "some embodiments" "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
    receiving, by one or more processors, an identification of both a first code object and a second code object, wherein the first code object and the second code object are both directed to producing a similar result when executed by one or more processors;
    determining that the first code object and the second code object each comprise a plurality of code subsets that together comprise the respective code object, wherein at least a first code subset of the first code object corresponds to a second code subset of the second code object;
    identifying at least one or more differences between the plurality of code subsets of the first code object and the plurality of code subsets of the second code object, the one or more differences including at least one of: a different ordering of the plurality of code subsets between the first code object and the second code object, or an additional code subset in the first code object that is not included in the second code object;
    identifying, by the one or more processors, duplicate code that exists in both the first code object and the second code object;
    providing, via a user interface, a recommendation to create an inheritance between the first code object and the second code object and to delete the duplicate code that exists in either the first code object or the second code object;
    receiving input via the user interface indicating at least one of the recommended actions to take with respect to either the first code object or the second code object; and
    updating, by the one or more processors, either the first code object or the second code object in accordance with the input indicating at least one of the recommended actions to take and reducing the one or more differences between the plurality of code subsets responsive to the input.

2. The method of claim 1, wherein the first code object and the second code object are both identified as being part of a same source code for an application.

3. The method of claim 1. wherein the identification of both the first code object and the second code object is received from a human user via the user interface.

4. The method of claim 1, wherein the plurality of code subsets include one or more methods.

5. The method of claim 1, further comprising:
    identifying version information indicating timestamps the plurality of code subsets were added to the both the first code object and the second code object.

6. The method of claim 5, wherein the identifying comprises:
    identifying, from the version information, timestamps corresponding to the one or more differences.

7. The method of claim 6, wherein the providing comprises:
    providing the notification to the user interface indicating the identified one or more differences and corresponding timestamps.

8. The method of claim 1, wherein the identification of the first code object is received via the user interface, and wherein the identification of the second object is identified by the one or more processors as being similar to the first code object.

9. A system, comprising:
    a memory; and
        at least one processor coupled to the memory and configured to perform instructions that cause the at least one processor to perform operations comprising:
        receiving an identification of both a first code object and a second code object, wherein the first code object and the second code object are both directed to producing a similar result when executed by one or more processors;
        determining that the first code object and the second code object each comprise a plurality of code subsets that together comprise the respective code object, wherein at least a first code subset of the first code object corresponds to a second code subset of the second code object;
        identifying at least one or more differences between the plurality of code subsets of the first code object and the plurality of code subsets of the second code object, the one or more differences including at least one of: a different ordering of the plurality of code subsets between the first code object and the second code object, or an additional code subset in the first code object that is not included in the second code object;

identifying, by the at least one processor, duplicate code that exists in both the first code object and the second code object;

providing, via a user interface, a recommendation to create an inheritance between the first code object and the second code object and to delete the duplicate code that exists in either the first code object or the second code object;

receiving input via the user interface indicating at least one of the recommended actions to take with respect to either the first code object or the second code object; and updating, by the at least one processor, either the first code object or the second code object in accordance with the input indicating at least one of the recommended actions to take and reducing the one or more differences between the plurality of code subsets responsive to the input.

10. The system of claim 9, wherein the first code object and the second code object are both identified as being part of a same source code for an application.

11. The system of claim 9, wherein the identification of both the first code object and the second code object is received from a human user via the user interface.

12. The system of claim 9, wherein the plurality of code subsets include one or more methods.

13. The system of claim 9, the operations further comprising:
identifying version information indicating timestamps the plurality of code subsets were added to the both the first code object and the second code object.

14. The system of claim 13, wherein the identifying comprises:
identifying, from the version information, timestamps corresponding to the one or more differences.

15. The system of claim 14, wherein the providing comprises:
providing the notification to the user interface indicating the identified one or more differences and corresponding timestamps.

16. A non-transitory computer-readable medium having instructions stored thereon that, when executed by at least one computing device, cause the at least one computing device to perform operations comprising:
receiving an identification of both a first code object and a second code object, wherein the first code object and the second code object are both directed to producing a similar result when executed by one or more processors;

determining that the first code object and the second code object each comprise a plurality of code subsets that together comprise the respective code object, wherein at least a first code subset of the first code object corresponds to a second code subset of the second code object;

identifying at least one or more differences between the plurality of code subsets of the first code object and the plurality of code subsets of the second code object, the one or more differences including at least one of: a different ordering of the plurality of code subsets between the first code object and the second code object, or an additional code subset in the first code object that is not included in the second code object;

identifying, by the at least one computing device, duplicate code that exists in both the first code object and the second code object;

providing, via a user interface, a recommendation to create an inheritance between the first code object and the second code object and to delete the duplicate code that exists in either the first code object or the second code object;

receiving input via the user interface indicating at least one of the recommended actions to take with respect to either the first code object or the second code object; and updating, by the at least one computing device, either the first code object or the second code object in accordance with the input indicating at least one of the recommended actions to take and reducing the one or more differences between the plurality of code subsets responsive to the input.

17. The non-transitory computer-readable medium of claim 16, wherein the first code object and the second code object are both identified as being part of a same source code for an application.

18. The non-transitory computer-readable medium of claim 16, wherein the identification of both the first code object and the second code object is received from a human user via the user interface.

19. The non-transitory computer-readable medium of claim 16, wherein the plurality of code subsets include one or more methods.

20. The method of claim 8, further comprising:
providing an indication of the identification of the second object via the user interface; and
receiving, via the user interface, a confirmation that the identification of the second object is correct.

* * * * *